(12) United States Patent
Nakagawa et al.

(10) Patent No.: US 9,303,690 B2
(45) Date of Patent: Apr. 5, 2016

(54) ROLLING BEARING

(71) Applicant: NTN CORPORATION, Osaka (JP)

(72) Inventors: Tsutomu Nakagawa, Shizuoka (JP); Masashi Nishimura, Shizuoka (JP); Shinji Oishi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/363,118

(22) PCT Filed: Nov. 22, 2012

(86) PCT No.: PCT/JP2012/080256
§ 371 (c)(1),
(2) Date: Jun. 5, 2014

(87) PCT Pub. No.: WO2013/084724
PCT Pub. Date: Jun. 13, 2013

(65) Prior Publication Data
US 2015/0049976 A1 Feb. 19, 2015

(30) Foreign Application Priority Data

Dec. 9, 2011 (JP) ................................. 2011-269938

(51) Int. Cl.
*F16C 19/26* (2006.01)
*F16C 33/46* (2006.01)
*F16C 33/66* (2006.01)

(52) U.S. Cl.
CPC .................. *F16C 33/46* (2013.01); *F16C 19/26* (2013.01); *F16C 33/4617* (2013.01); *F16C 33/4635* (2013.01); *F16C 33/4676* (2013.01); *F16C 33/6651* (2013.01); *F16C 2208/58* (2013.01); *F16C 2208/62* (2013.01); *F16C 2240/44* (2013.01)

(58) Field of Classification Search
CPC .......... F16C 19/22–19/28; F16C 19/44–19/48; F16C 33/467; F16C 33/4676; F16C 33/46; F16C 33/6677; F16C 33/6681
See application file for complete search history.

(56) References Cited

U.S. PATENT DOCUMENTS

2005/0143215 A1* 6/2005 Fugel ............................ 475/331
2013/0004111 A1* 1/2013 Sadamura et al. ............ 384/572
2014/0177986 A1* 6/2014 Hsu ................................ 384/51
2014/0221150 A1* 8/2014 Nakagawa et al. ........... 475/348

FOREIGN PATENT DOCUMENTS

JP 10-318264 12/1998
JP 11-22737 1/1999
(Continued)

OTHER PUBLICATIONS

International Preliminary Report on Patentability and Written Opinion of the International Searching Authority issued Jun. 19, 2014 in International (PCT) Application No. PCT/JP2012/080256.
(Continued)

*Primary Examiner* — Alan B Waits
(74) *Attorney, Agent, or Firm* — Wenderoth, Lind & Ponack, L.L.P.

(57) ABSTRACT

A rolling bearing comprises rollers and a retainer which holds the rollers. On an inner diameter surface of each of annular regions in the retainer, a cutout is formed from an axially outer side end surface of the retainer toward an inner side of the retainer. Each cutout has an outer diametrical position on a more radially outer position than an outer diametrical end of an inner-side projection of the retainer.

2 Claims, 4 Drawing Sheets

(56) References Cited

FOREIGN PATENT DOCUMENTS

| | | |
|---|---|---|
| JP | 2001-41250 | 2/2001 |
| JP | 2011-174538 | 9/2011 |

OTHER PUBLICATIONS

International Search Report issued Feb. 12, 2013 in International (PCT) Application No. PCT/JP2012/080256.

* cited by examiner

ROLLING BEARING

BACKGROUND OF INVENTION

Technical Field

The present invention relates to rolling bearings suitably applicable to planetary gear reduction apparatuses.

BACKGROUND ART

As shown in FIG. 4 through FIG. 6, a roller bearing 21 comprises an outside member 23 which includes an inner circumferential surface having a cylindrical outer ring track 22; an inside member 25 which includes an outer circumferential surface having a cylindrical inner ring track 24; and a plurality of rollers 26 which are rotatable between these outer ring track 22 and the inner ring track 24.

The rollers 26 are held rotatably by a retainer 27 which is formed into a cylindrical shape as a whole. The retainer 27 has pockets 28 for housing the rollers 26 at a predetermined interval in a circumferential direction; pillars 29 between the pockets 28 which are mutually adjacent in the circumferential direction; and annular portions 30 at both axial sides of the pillar 29.

The pillar 29 of the retainer 27 has inner-side projections 31 and outer-side projections 32 on a radially inner side and a radially outer side on both axial sides for preventing the rollers 26 from dropping off.

For example, at three locations, i.e., at an axially intermediate position and at two axial end positions of the pillar 29, there are formed oil paths 33A, 33B extending radially inward and outward, except for regions formed with the inner-side projections 31 or the outer-side projections 32. With this arrangement, lubricant oil is centrifugally delivered from radially inner side toward outer side of the retainer 27, via each of the oil paths 33A, 33B, thereby ensuring sufficient flow and amount of lubrication oil within the roller bearing 21.

The roller bearing 21 which has the construction as described above is used, for example, in a planetary gear reduction apparatus as a bearing for supporting a planetary gear (the outside member 23) with a supporting pin (the inside member 25) in each of the reduction gear mechanisms.

In such a case as described, a gap formed between the outside member 23 and the retainer 27 serves as an outer-side oil path 34 whereas a gap formed between the inside member 25 and the retainer 27 serves as an inner-side oil path 35, so lubricant oil inside a housing, which provides an outer form of the planetary gear reduction apparatus, flows through the outer-side oil path 34 and the inner-side oil path 35, into each of the pockets 28 of the roller bearing 21. Then, as the planetary gear rotates and thereby generates centrifugal force, the lubricant oil is centrifugally delivered through the oil paths 33A, 33B, from radially inner side toward outer side of the retainer 27. This provides a high level of lubrication in the roller bearing 21.

Now, while the roller bearing 21 is used in the planetary gear reduction apparatus as described above, there is generated dust during operation, such as abrasion powder and flakes of seals from mesh surfaces of the gears or from seal members, and these dusts are carried in the flow of lubricant oil and enters the pockets 28 of the roller bearing 21.

However, each pocket 28 of the roller bearing 21 is partitioned by the pillar 29, which is provided with the inner-side projections 31 and the outer-side projections 32 to prevent the roller 26 from dropping off.

Therefore, as the roller 26 rotates while making contact with the inner-side projections 31 and the outer-side projections 32 of the pillar 29, lubricant oil on an outer surface of the roller 26 is squeezed off by the inner-side projections 31 and the outer-side projections 32 and the dust accumulates where the roller 26 makes contact with the inner-side projections 31 and the outer-side projections 32.

As a result, there has been a problem that the rollers 26 in the pockets 28 wear quickly due to abrasion with the dust, and particularly with metal abrasion powder such as steel powder, which has accumulated at the inner-side projections 31 and the outer-side projections 32.

Especially in recent years, manufacturers of the reduction gear apparatuses are trying to reduce their cost by reducing steps in gear finishing processes for example, so the gears have an increased surface roughness, and there have been many cases where meshing gears have removed surface roughness projections, producing a large amount of abrasion powder. Consequently, preventing the rollers from wear which is caused by metal abrasion powder is now an important object.

As a solution to the abrasion powder problem, Patent Literature 1 discloses an arrangement that an inner diameter surface of the annular portions 30 in the retainer 27 is inclined axially outward for improved flow of lubricant oil.

Also, Patent Literature 2 discloses an arrangement that a gap between an inner diameter surface of the annular portion 30 in the retainer 27 and the inside member 25 is increased for improved flow of lubricant oil.

CITATION LIST

Patent Literature

Patent Literature 1: JP-A-H10-318264
Patent Literature 2: JP-A-H11-22737

Technical Problem

However, improving the flow of lubricant oil, as mentioned above, between the inner diameter surface of the annular portions 30 in the retainer 27 and the inside member 25 does not solve the problem that dust such as metal abrasion powder will accumulate at the inner-side projections 31 as the lubricant oil flows from radially inner side to radially outer side of the retainer 27 and the accumulated dust will cause premature failure of the rollers.

SUMMARY OF INVENTION

It is therefore an object of the present invention to prevent the rollers and the inner-side projections and the outer-side projections of the retainer pillars from catching the abrasion powder even under an application environment where there is a large amount of abrasion powder, and to prevent dust such as metal abrasion powder from accumulating at the inner-side projections when lubricant oil flows from radially inner side toward radially outer side of the retainer, thereby extending the life of roller bearings.

Solution to Problem

In order to solve the problems described above, the present invention provides a roller bearing which comprises: an outside member including an inner circumferential surface having a cylindrical outer ring track; an inside member including an outer circumferential surface having a cylindrical inner ring track; a plurality of rollers rotatable between these outer ring track and the inner ring track; and a retainer which holds the rollers at a predetermined interval in a circumferential direction. The retainer is cylindrical as a whole, is formed with: pockets at a predetermined interval in the circumferential direction for housing the rollers; a pillar between any two pockets which are mutually adjacent in the circumferential direction; and annular regions on two axial sides of the pillar. Each pillar has inner-side projections and outer-side projections on a radially inner side and a radially outer side on two axial sides for preventing the rollers from dropping off. With the above-described arrangement, the retainer's annular regions have their inner diameter surfaces formed with cutouts from the retainer's axially outer side end surface toward an inner side, and the cutouts have their outer diametrical position being on a more radially outer position than an outer diametrical end of the inner-side projection of the retainer.

According to the present invention, a position of the inner-side projection of the pillar in the retainer and a position of the cutout in the annular region are controlled as follows:

Namely, where A represents an outer diametrical dimension of the cutout formed in the annular region; B represents an inner diametrical dimension of the retainer; and C represents an outer diametrical dimension to the outer diameter side end of the inner-side projection formed in the pillar; then the cutout has a depth defined by A−B=E, whereas a dimension from the inner diameter of the retainer to the outer diameter side end of the inner-side projection is defined by C−B=F. If there is a relationship expressed as E>F, then the inner-side projection is within the depth range of the cutout.

By positioning the inner-side projection of the pillar within the depth range of the cutout which is formed in the annular region as described above, the inner-side projection of the pillar improves axial flow of lubricant oil from an inner diameter side of the retainer toward the cutout which is formed in the annular region, making it less likely that dust such as metal abrasion powder contained in the lubricant oil will stay at the inner-side projection of the pillar.

A lubrication hole is formed in the inside member for supplying lubricant oil to an axial center of the retainer. This makes it possible to ensure good axial flow of lubricant oil from a radially inner side of the retainer toward the cutout which is formed in the annular region.

The retainer is made of a resin material or a material containing iron.

Examples of the resin material include polyamide 66, polyamide 46, polyether ether ketone, polyphenylene sulfide, etc. Fiberglass may be used for reinforcement.

The roller bearing according to the present invention is usable in a planetary gear reduction apparatus, for example. In this case, the outside member is used as a planetary gear while the inside member is used as a support pin.

Advantageous Effects of Invention

According to the roller bearing offered by the present invention, there is an improved axial flow of lubricant oil from an inner diameter side of the retainer toward the cutout which is formed in the annular region. Therefore, it is less likely that dust such as metal abrasion powder contained in the lubricant oil will stay at the inner-side projection of the pillar.

Hence, rolling bearings according to the present invention are less subject to such problems as indentations and loss of oil film from roller surfaces, and has a longer life even when used in planetary gear reduction apparatuses which are prone to produce metal abrasion powder.

DESCRIPTION OF EMBODIMENTS

Figure 1:
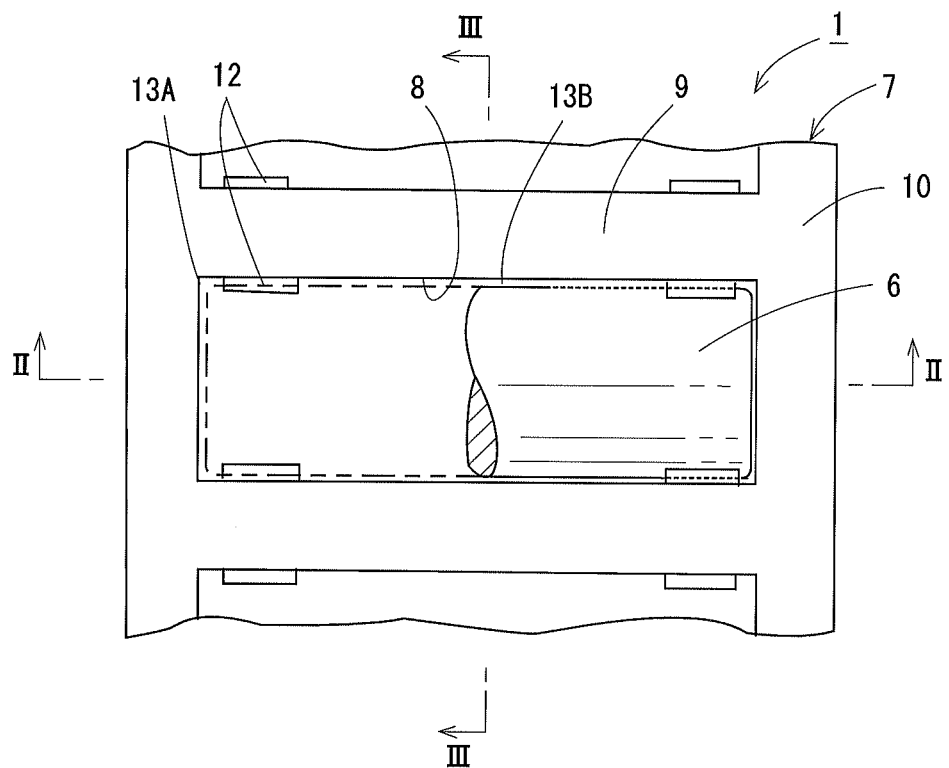
FIG. 1 is a plan view showing part of a roller bearing according to an embodiment of the present invention.

Embodiments of the present invention will be described based on FIG. 1 through FIG. 3.

A roller bearing 1 comprises an outside member 3 which includes an inner circumferential surface having a cylindrical outer ring track 2; an inside member 5 which includes an outer circumferential surface having a cylindrical inner ring track 4; and a plurality of rollers 6 which are rotatable between these outer ring track 2 and the inner ring track 4.

The rollers 6 are cylindrical bodies made of a metal material for example, formed as needle rollers, long cylindrical rollers, etc., and entirely encased in a cylindrical retainer 7, forming an array of a uniform interval.

The retainer 7, formed of a resin material by means of injection molding for example, has rectangular pockets 8 at a predetermined interval from one to another in a circumferential direction for housing the rollers 6 in the uniform interval. The retainer 7 is penetrated by the pockets 8 from a radially inner side to a radially outer side, and has a pillar 9 between any two pockets 8 which are mutually adjacent in the circumferential direction. The retainer 7 also has annular regions 10 on both axial sides of the pillars 9. As shown in FIG. 2, the annular region 10 has its inner diameter surface formed with a cutout 16 receding inward from an axially outer end surface of the retainer 7.

The retainer 7 is axially positioned by washers 18 which are fitted to the inside member 5.

Examples of the resin material for forming the retainer 7 include polyamide 66, polyamide 46, polyether ether ketone, polyphenylene sulfide, etc. Fiberglass may be used for reinforcement.

The pillar 9 of the retainer 7 has inner-side projections 11 and outer-side projections 12 on a radially inner side and a radially outer side on both axial sides for preventing the rollers 6 from dropping off.

The inner-side projection 11 and the cutout 16 in the annular region 10 has a specific positional relationship; i.e., the cutout 16 has an outer diametrical position, which is on a more radially outer position than an outer diametrical end of the inner-side projection 11 of the retainer 7.

Figure 2:
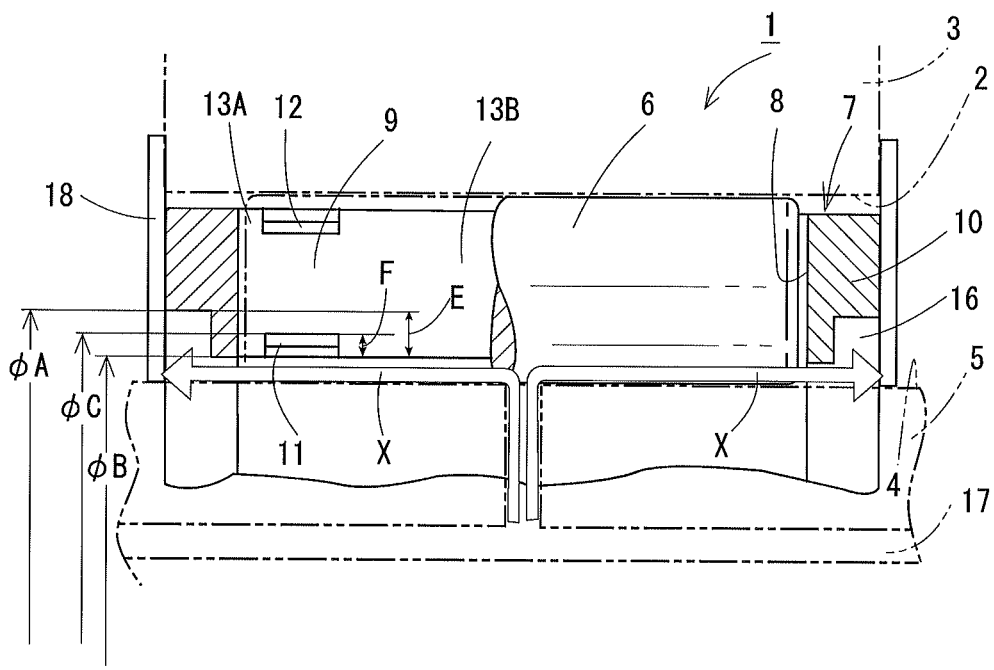
FIG. 2 is a sectional view taken in line II-II in FIG. 1.
Figure 3:
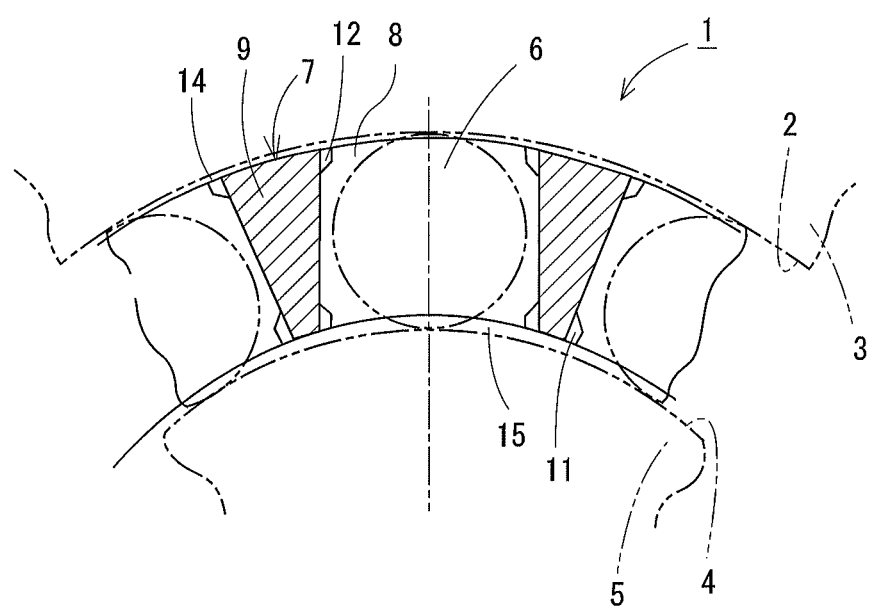
FIG. 3 is a sectional view taken in line in FIG. 1.
Figure 4:
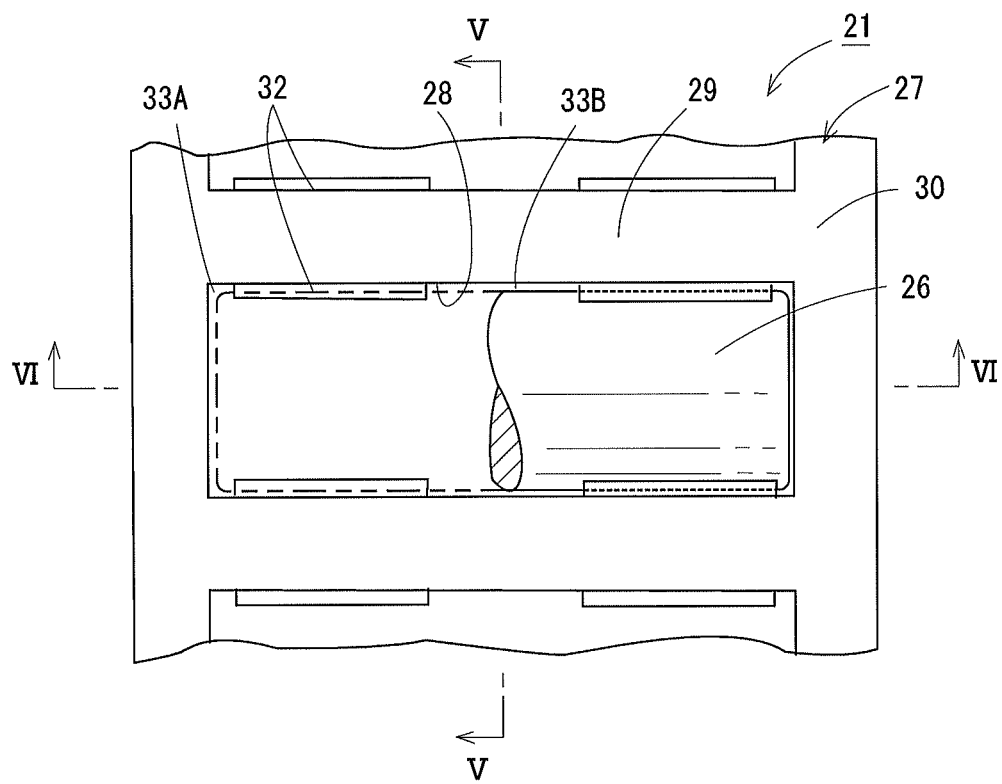
FIG. 4 is a plan view showing part of a conventional roller bearing.
Figure 5:
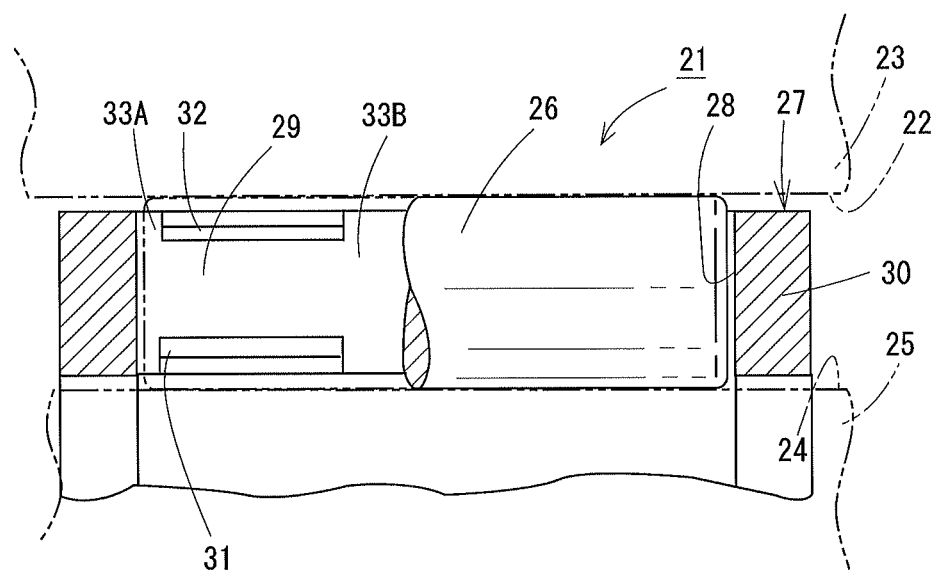
FIG. 5 is a sectional view taken in line VI-VI in FIG. 4.
Figure 6:
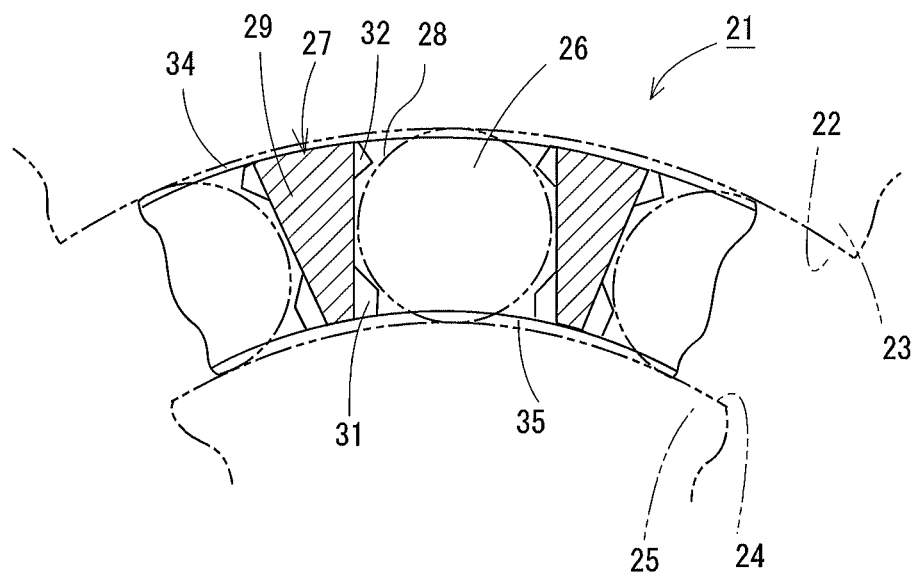
FIG. 6 is a sectional view taken in line V-V in FIG. 4.

In other words, as shown in FIG. 2, where A represents an outer diametrical dimension of the cutout 16 formed in the annular region; B represents an inner diametrical dimension of the retainer 7; and C represents an outer diametrical dimension to the outer diameter side end of the inner-side projection 11 formed in the pillar 9; then the cutout 16 has a depth defined by A−B=E, whereas a dimension from the inner diameter of the retainer 7 to the outer diameter side end of the inner-side projection 11 is defined by C−B=F. If there is a relationship expressed as E>F, then the inner-side projection 11 is within the depth range of the cutout 16.

By positioning the inner-side projection 11 of the pillar 9 within the depth range of the cutout 16 formed in the annular region 10 as described above, the inner-side projection 11 of the pillar 9 improves axial flow of lubricant oil (white arrows X) from an inner diameter side of the retainer 7 toward the cutout 16 which is formed in the annular region 10, making it less likely that dust such as metal abrasion powder contained in the lubricant oil will stay at the inner-side projection 11 of the pillar 9.

A lubrication hole 17 is formed in the inside member 5, i.e., a support shaft which represents a member on the radially inner side of the retainer 7, for supplying lubricant oil to an axial center of the retainer 7. This makes it possible to ensure good axial flow of lubricant oil from a radially inner side of the retainer 7 toward the cutout 16 which is formed in the annular region 10.

At three locations, i.e., at an axially intermediate position and at two axial end positions of the pillar 9, there are formed oil paths 13A, 13B extending radially inward and outward, except for regions formed with the inner-side projections 11 or the outer-side projections 12. With this arrangement, lubricant oil is centrifugally delivered from radially inner side toward outer side of the retainer 7, via each of the oil paths 13A, 13B, thereby ensuring sufficient flow of the lubricant oil and amount of lubrication within the roller bearing 1.

INDUSTRIAL APPLICABILITY

The roller bearing 1 according to the present invention is used, for example, in a planetary gear reduction apparatus as a bearing for supporting a planetary gear (outside member 3) in each of the reduction gear mechanisms with a supporting pin (inside member 5).

In such a case as the above, a gap formed between the outside member 3 and the retainer 7 serves as an outer-side oil path 14 whereas a gap formed between the inside member 5 and the retainer 7 serves as an inner-side oil path 15, so lubricant oil inside a housing, which provides an outer form of the planetary gear reduction apparatus, flows through the outer-side oil path 14 and the inner-side oil path 15, into the roller bearing 1. Then, as the planetary gear rotates and thereby generates centrifugal force, the lubricant oil is centrifugally delivered through the oil paths 13A, 13B, from radially inner side toward outer side of the retainer 7. This provides a high level of lubrication in the roller bearing 1.

REFERENCE SIGNS LIST 1 roller bearing
2 outer ring track
3 outside member
4 inner ring track
5 inside member
6 roller
7 retainer
8 pocket
9 pillar
10 annular region
11 inner-side projection
12 outer-side projection
13A oil path
13B oil path
14 outer-side oil path
15 inner-side oil path
16 cutout
17 lubrication hole
18 washer

The invention claimed is:

1. A roller bearing comprising:
an outside member including an inner circumferential surface having a cylindrical outer ring track;
an inside member including an outer circumferential surface having a cylindrical inner ring track;
a plurality of rollers rotatable between the cylindrical outer ring track and the cylindrical inner ring track; and
a retainer which holds the rollers at a predetermined interval in a circumferential direction; the retainer being cylindrical as a whole, formed with: pockets at a predetermined interval in the circumferential direction for housing the rollers, a pillar between any two of the pockets which are mutually adjacent in the circumferential direction, and annular regions on two axial sides of the pillar; the pillar having inner-side projections on a radially inner side and outer-side projections on a radially outer side on the two axial sides of the pillar for preventing the rollers from dropping off;
wherein the annular regions have inner diameter surfaces formed with cutouts from an axially outer side end surface of the retainer toward an inner side of the retainer, an outer diametrical position of each of the cutouts being on a more radially outer position than an outer diametrical end of a corresponding one of the inner-side projections of the retainer,
wherein A represents an outer diametrical dimension of one of the cutouts formed in one of the annular regions, B represents an inner diametrical dimension of the retainer, C represents an outer diametrical dimension to the outer diametrical end of the corresponding one of the inner-side projections of the pillar, E (=A −B) represents a depth of the one of the cutouts, and F (=C −B) represents a dimension from an inner diameter of the retainer to the outer diametrical end of the corresponding one of the inner-side projections, and there are relationships expressed as E >F and A >C.

2. The roller bearing according to claim 1, wherein the inside member, which is a member on a radially inner side of the retainer, is formed with a lubrication hole for supplying lubricant oil to an axial center of the retainer.

* * * * *